(12) United States Patent
MacLachlan et al.

(10) Patent No.: US 8,387,020 B1
(45) Date of Patent: Feb. 26, 2013

(54) VERIFYING THAT A METHOD HAS BEEN IMPLEMENTED FOR A PROGRAM WRITTEN IN A DYNAMIC PROGRAMMING LANGUAGE

(75) Inventors: David MacLachlan, Morgan Hill, CA (US); Thomas E. Van Lenten, Ashburn, VA (US)

(73) Assignee: Google Inc., Mountain View, CA (US)

( * ) Notice: Subject to any disclaimer, the term of this patent is extended or adjusted under 35 U.S.C. 154(b) by 1352 days.

(21) Appl. No.: 11/782,793

(22) Filed: Jul. 25, 2007

(51) Int. Cl.
*G06F 9/44* (2006.01)
*G06F 9/45* (2006.01)

(52) U.S. Cl. ......... 717/126; 717/124; 717/133; 717/148

(58) Field of Classification Search ........................ None
See application file for complete search history.

(56) References Cited

U.S. PATENT DOCUMENTS

| | | | | |
|---|---|---|---|---|
| 5,481,721 | A | | 1/1996 | Serlet et al. |
| 5,953,527 | A | | 9/1999 | Cable |
| 7,398,517 | B2 | * | 7/2008 | Berg et al. ..................... 717/126 |
| 7,584,455 | B2 | * | 9/2009 | Ball .............................. 717/124 |
| 7,617,489 | B2 | * | 11/2009 | Peyton et al. ................. 717/133 |
| 7,624,304 | B2 | * | 11/2009 | Thiagarajan et al. ......... 717/124 |
| 7,703,075 | B2 | * | 4/2010 | Das et al. ...................... 717/126 |
| 7,958,493 | B2 | * | 6/2011 | Lindsey et al. ............... 717/148 |
| 7,962,901 | B2 | * | 6/2011 | McCamant et al. .......... 717/126 |
| 8,046,746 | B2 | * | 10/2011 | Tillmann et al. .............. 717/133 |
| 2003/0131347 | A1 | * | 7/2003 | Allison ......................... 717/165 |
| 2003/0145282 | A1 | * | 7/2003 | Thomas et al. ............... 715/513 |
| 2006/0259830 | A1 | * | 11/2006 | Blevin et al. ................... 714/45 |
| 2007/0028210 | A1 | * | 2/2007 | Meijer et al. ................. 717/114 |
| 2007/0067372 | A1 | * | 3/2007 | Meijer ........................... 707/206 |
| 2007/0261029 | A1 | * | 11/2007 | Iyer .............................. 717/124 |
| 2008/0235675 | A1 | * | 9/2008 | Chen ............................ 717/147 |
| 2009/0288067 | A1 | * | 11/2009 | Nathan et al. ................. 717/114 |
| 2010/0017620 | A1 | * | 1/2010 | Horne et al. .................. 713/187 |
| 2010/0299660 | A1 | * | 11/2010 | Torgersen et al. ............ 717/148 |
| 2011/0179402 | A1 | * | 7/2011 | Buckley et al. ............... 717/148 |

OTHER PUBLICATIONS

Bush et al., "A static analyzer for finding dynamic programming erros", 2000, John Wiley & Sons, Ltd, pp. 775-802 <http://onlinelibrary.wiley.com/doi/10.1002/(SICI)1097-024X(200006)30:7%3C775::AID-SPE309%3E3.0.CO;2-H/pdf>.*
Tristan Allwood, "Pluggable, Iterative Type Checking for Dynamic Programming Languages", 2006 University of London, pp. 1-67; <http://www.doc.ic.ac.uk/~tora/previous/project/Report.pdf>.*
Baars et al., "Typing Dynamic Typing", 2002 ACM, ICFP'02 Oct. 4-6, 2002, pp. 157-166; <http://dl.acm.org/citation.cfm?doid=583852.581494>.*

(Continued)

*Primary Examiner* — Thuy Dao
*Assistant Examiner* — Ben C Wang
(74) *Attorney, Agent, or Firm* — Sterne, Kessler, Goldstein & Fox PLLC

(57) ABSTRACT

One embodiment of the present invention provides a system that verifies that a program method has been implemented for a program written in a dynamic programming language. During operation, the system receives a user request to check for an implementation of a program method (or method) that is called in the program. The system uses information in this user request to generate a testing method that determines whether a class associated with the method responds to a specific request. This testing method is executed at run-time to verify that the method is implemented for the program.

18 Claims, 3 Drawing Sheets

OTHER PUBLICATIONS

Linda Dailey Paulson, "Developers Shift to Dynamic Programing Languages", IEEE, pp. 12-15; <http://ieeexplore.ieee.org/stamp/stamp.jsp?tp=&arnumber=4085614>.*

Dean, J., et al., "Optimization of Object-Oriented Programs Using Static Class Hierarchy Analysis, " *Department of Computer Science and Engineering,* FR-35, University of Washington, United States (1994).

Non-Final Office Action mailed May 24, 2011 in U.S. Appl. No. 11/782,778, filed Jul. 25, 2007, inventors MacLachlan and Miller.

Final Office Action mailed Feb. 13, 2012 in U.S. Appl. No. 11/782,778, filed Jul. 26, 2007, inventors MacLachlan and Miller.

Co-pending U.S. Appl. No. 11/782,778, MacLachlan and Miller, filed Jul. 25, 2007.

* cited by examiner

VERIFYING THAT A METHOD HAS BEEN IMPLEMENTED FOR A PROGRAM WRITTEN IN A DYNAMIC PROGRAMMING LANGUAGE

BACKGROUND

1. Field of the Invention

The present invention relates to techniques for verifying program correctness. More specifically, the present invention relates to a method and an apparatus for verifying at run-time that a program method has been implemented for a program written in a dynamic programming language.

2. Related Art

A compiler is a computer program that translates program text written in a high-level programming language into executable instructions. Program developers generally specify the functionality of a program using a high-level programming language, and then use the compiler to convert the high-level structures of that programming language into machine-specific instructions.

In a statically-typed programming language, the compiler can verify and enforce the data-types for the language (e.g., perform "type-checking") at compile time, which means that the system does not need to resolve any data-types at run-time. For instance, the compiler for a statically-typed language can determine the correct method implementation for a called program method at compile time, and can then include this method implementation in the executable program binary. Alternatively, in a dynamically-typed programming language, data-types may not be known until run-time. Because of this lack of type information, an incomplete program written in such a language may still compile and link, but may not run correctly due to method calls that cannot be resolved at run-time. For instance, program methods hidden in an obscure conditional execution path may not be detected by program testing, and may result in program failure after the program has been released.

Hence, what is needed is a method that facilitates writing programs in dynamic programming languages without the above-described problems.

SUMMARY

One embodiment of the present invention provides a system that verifies that a program method has been implemented for a program written in a dynamic programming language. During operation, the system receives a user request to check for an implementation of a program method (or method) that is called in the program. The system uses information in this user request to generate a testing method that determines whether a class associated with the method responds to a specific request. This testing method is executed at run-time to verify that the method is implemented for the program.

In some embodiments, the user request is specified using a program macro. The system uses a preprocessor that expands this program macro into the testing program method during compilation of the program.

In some embodiments, the testing method is executed at the onset of program execution. If the testing method indicates that the method is not implemented in the program, the system signals an error and program execution ends.

In some embodiments, the testing method provides a forced run-time check for the method that does not require the compiler for the dynamic programming language to be changed.

In some embodiments, the system generates a set of such testing methods in response to two or more user requests. Each of these testing methods is unique and includes an identifier. A central program method in the program looks up and executes this set of testing methods at the onset of program execution.

In some embodiments, a given testing method includes checks that ensure that the testing method is only executed once for each check related to the method.

In some embodiments, additional executable code can be dynamically added to the program after execution has begun. In these embodiments, a run-time environment can ensure that associated testing methods in the additional executable code are automatically executed when this additional executable code is dynamically added during program execution.

In some embodiments, the testing method is executed during program development, but is not included in a released version of the program.

In some embodiments, the dynamic programming language is the OBJECTIVE-C programming language and/or Objective C++.

In some embodiments, the specific request is a program method defined for all objects in the dynamic programming language. This specific request determines whether the method exists for the class.

Figure 1:
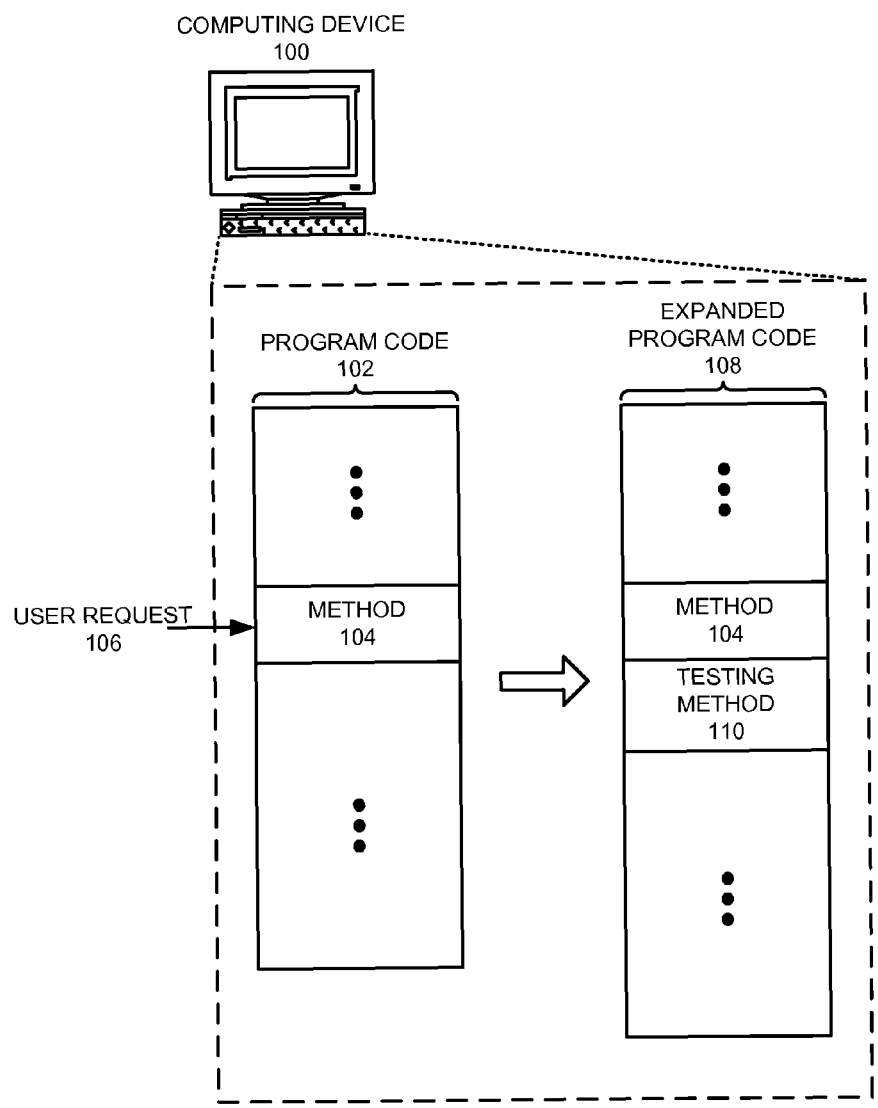
FIG. 1 illustrates a computing device that stores program code in accordance with an embodiment of the present invention.

Table 1 illustrates sample method invocations in both a statically-typed language and a dynamically-typed language and a representation of the output generated by their respective compilers in accordance with an embodiment of the present invention.

Table 2 illustrates exemplary OBJECTIVE-C code for the interface to a class in accordance with an embodiment of the present invention.

Table 3 illustrates an exemplary OBJECTIVE-C program that can be compiled successfully but is incomplete and will not run correctly in accordance with an embodiment of the present invention.

Table 4 illustrates exemplary OBJECTIVE-C program code that includes GM_METHOD_CHECK macros in accordance with an embodiment of the present invention.

Table 5 illustrates a set of OBJECTIVE-C testing methods generated for the program code illustrated in Table 4 in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Dynamically-Typed Languages

Program code written in dynamically-typed programming languages (such as the OBJECTIVE-C programming language or the Objective C++ programming language) is typically compiled into machine instructions in a manner similar to program code written in statically-typed programming languages such as C or C++. However, for dynamically-typed programming languages, a set of decisions, such as which set of instructions should be used for a given program method (also referred to simply as a "method"), may not be resolved until run-time. Hence, compilers for such dynamic programming languages often allow programs to compile and link without errors, but the programs may not run correctly due to structures that cannot be resolved at run-time. In statically-typed languages, such decisions are typically made at compile time or at the time that a program binary is linked, thereby resolving (or signaling) potential problems.

Table 1 illustrates sample method invocations in both a statically-typed programming language (C++) and a dynamically-typed programming language (OBJECTIVE-C programming language), as well as a representation of the output generated by their respective compilers. For the C++ compiler, the invocation of the method doSomething on instance s of class sample results in a (static) call to a method for the sample class that includes the calling object (this) as the argument. This class method is compiled into an explicit set of instructions and the program is statically linked such that, during execution, the thread of execution jumps to the set of instructions for the method implementation. Once the code has been compiled, the executable is fixed, and there is no mechanism to affect methods within the executable.

TABLE 1

```
C++ program code:
    sample *s = (allocate object of class sample);
    s.doSomething( );.    // class method invocation
Compiler generates:
    ... sample_doSomething(this)
OBJECTIVE-C program code:
    sample *s = (allocate object of class sample);
    [s doSomething]    // method invocation
Compiler generates:
    ... objc_msgsend(self, selector)
```

In the OBJECTIVE-C programming language, method invocations can be considered to be "messages" sent to objects of a specified type. For instance, a substantially similar set of code written in the OBJECTIVE-C programming language may instead compile to a general method (objc_msgsend) that takes as arguments both an object (in this case self) and a selector (selector) that together indicate to the run-time environment which specific method implementation should be used. Note that dynamically-typed languages may include run-time mechanisms to facilitate such dynamic operations. In the OBJECTIVE-C programming language, the dynamic library "libobjc" is linked in to handle such dynamic method calls (often referred to as "messages" in the OBJECTIVE-C programming language). Identifying the specific method code at run-time can provide a range of benefits, including allowing methods to be overridden and/or program behavior to be changed after compilation.

Table 2 illustrates exemplary OBJECTIVE-C code for the interface to a class ("My class"), which inherits from the type NSObject. Table 2 illustrates an interface that declares an instance variable and two methods, as well as implementations for the two methods. This class can later be extended beyond its initial declaration by defining a "category" that affects the class. For instance, the category definition shown in Table 2 adds a definition and implementation for a third method for My class. This category definition may be included into the program binary at compile time, or also later as part of a dynamic library that is loaded into the program during execution. Note that such functionality can be added without re-compiling the original interface definition.

TABLE 2

```
// Class interface and implementation for "MyClass"
@interface MyClass : NSObject {
    int aVar;        // exemplary instance variable
}
- (int)method1;    // exemplary method declaration
- (int)method2;
@end
@implementation MyClass
-(int) method1 {   // exemplary method implementation
    return 1;
}
-(int) method2 {
    return 2;
}
@end
// Category definition
@interface MyClass (MyClassCategory)
- (int)method3;
@end
@implementation MyClass (MyClassCategory)
-(int) method3 {
    return 3;
}
@end
```

The ability to add and/or modify methods without re-compiling the entire program facilitates manipulating large sets of existing code. For instance, it enables a developer to selectively extend portions of a framework with thousands of classes (such as the OBJECTIVE-C Cocoa framework) without requiring access to the source code for the framework. Instead, the developer can extend and compile only the desired set of method definitions and implementations. For example, a developer can fix a bug in a framework method by creating a replacement method in a dynamic library and then having the run-time environment automatically redirect messages to the given class and selector to that replacement method. Such changes can be limited only to a given executable file, and hence not affect other programs running on the same machine that use the original set of executable code. Categories that dynamically extend and/or add additional methods to a parent class can also be used to easily add functionality to any classes that inherit from that parent class (without re-compilation of the original classes). Such techniques allow developers to easily leverage and extend existing capabilities while writing software. In statically-typed languages, such extensions are typically impossible without access to the full source code and re-compilation of all of the involved classes.

TABLE 3

```
#import <Foundation/Foundation.h>
@interface NSString (MissingCategory)
- (void)methodMissing;
@end
int main(int argc, char**argv) {
    NSAutoreleasePool *pool = [[NSAutoreleasePool alloc] init];
    [@"Hello" methodMissing];
    [pool release];
    return 0;
}
```

While dynamically-typed programming languages can provide substantial benefits, as described above, they also present some drawbacks. As mentioned previously, dynamic resolution of methods can sometimes result in programs that compile and link without errors, but then do not run correctly. For instance, Table 3 illustrates an exemplary OBJECTIVE-C program that can be compiled, but which is incomplete and will not run correctly. In this case, the methodMissing selector has been declared, but no methodMissing method implementation is defined. In this example the program will crash at launch, but if the usage of methodMissing is hidden in an obscure conditional execution path (e.g., so that it only runs on a certain date, or when a certain set of conditions are met), such an error might not be detected during testing and may cause errors after the program has been released.

One embodiment of the present invention provides a system that verifies that a program method implementation has been included for a program written in a dynamically-typed programming language. This system leverages user input to generate checks that are executed at run-time to confirm that one or more program methods have been implemented.

Checking Program Method Implementations in Dynamic Languages

In one embodiment of the present invention, the system verifies that a program method implementation has been included for a program written in a dynamic programming language. During operation, the system receives a user request to test whether an implementation exists for a program method (also referred to as a method) in the program. The system uses information from this request to generate a testing method that checks whether a specific class associated with the method responds to a specific request. This testing method is executed at run-time to confirm that the method is implemented in the program.

In one embodiment of the present invention, the specific request is a method (also referred to as a "message" in some dynamic programming languages, such as the OBJECTIVE-C programming language) that tests whether the class associated with the method includes an implementation for the method. For instance, in the OBJECTIVE-C programming language, every object class supports the method RespondsToSelector, which takes a selector as an argument and indicates whether the given object implements a method for that selector. Invoking RespondsToSelector with the selector for the method as an argument returns an indication of whether the method is implemented for a class associated with that object.

FIG. 1 illustrates a computing device 100 that stores program code 102. Program code 102 includes program method 104. During operation, the system receives user request 106 to verify that an implementation of method 104 is included for the program. The system uses information from user request 106 to generate testing method 110, which checks whether a class associated with method 104 responds to a specific request. The system includes this testing method 110 in the expanded set of program code 108, which is subsequently compiled. Testing method 110 is then executed at run-time to verify that an implementation for method 104 is included for the program.

Figure 2:
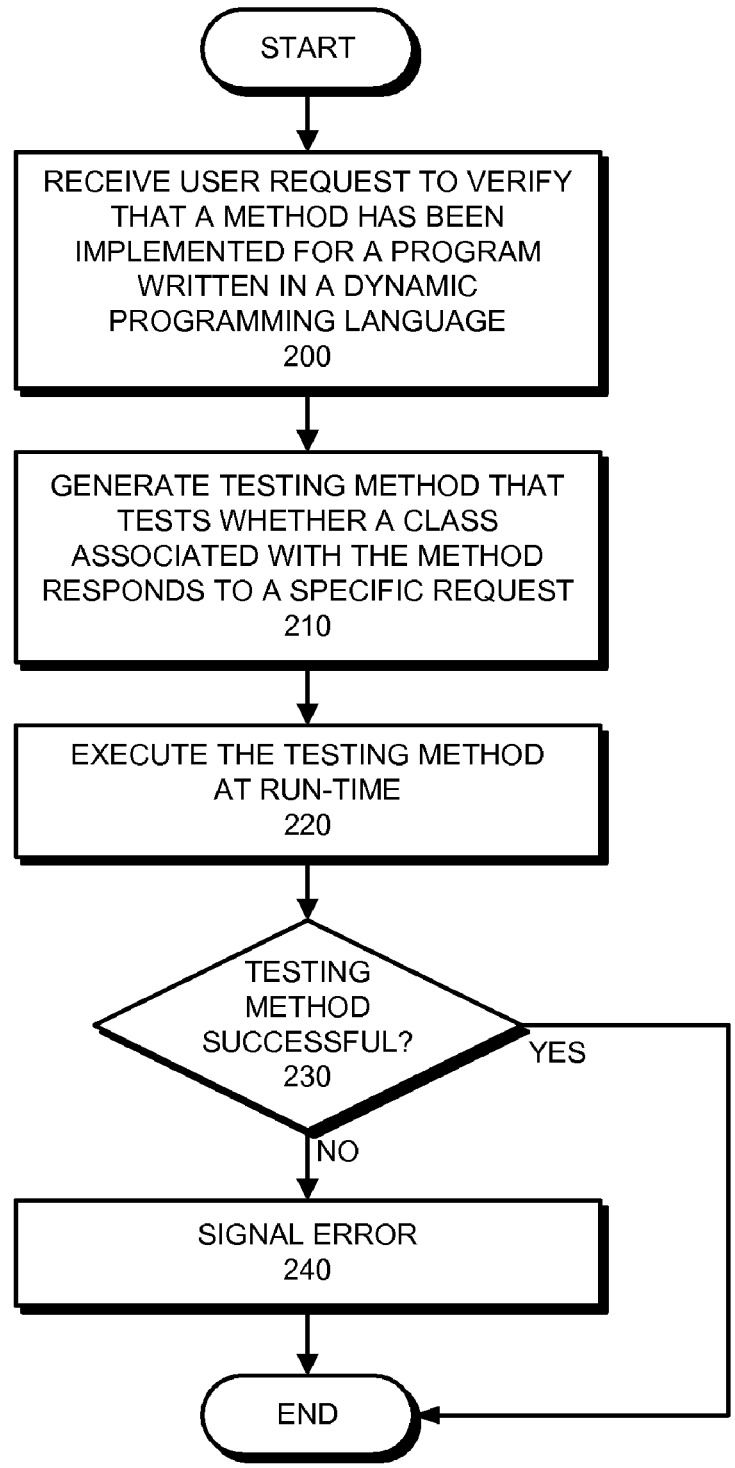
FIG. 2 presents a flow chart that illustrates the process of verifying that a method has been implemented for a program written in a dynamic programming language in accordance with an embodiment of the present invention.

FIG. 2 presents a flow chart that illustrates the process of verifying that a method has been implemented for a program written in a dynamic programming language. During operation, the system receives a user request to verify that a method implementation has been included for the program (operation 200). In response, the system generates a testing method that tests whether a class associated with the method responds to a specific request (operation 210). This testing method is executed at run-time (operation 220). If the testing method does not execute successfully (operation 230), the system signals an error (operation 240).

In one embodiment of the present invention, the system receives the user request as a program macro that is inserted into the program source code. For instance, a program developer can use a macro GM_METHOD_CHECK (class, selector) that takes as arguments a class type and a selector. The system expands this macro to create the testing method during a pre-processing and/or compilation operation, thereby inserting the test into the executable code without modifying the original program source code. A program developer can use such a macro to specify that the program needs an implementation to exist for a given method, and to ensure that the given method is indeed implemented. For instance, for the OBJECTIVE-C program code shown in Table 4, the macro GM_METHOD_CHECK is used to ensure that methods implemtations are included for the object class NSString that take the selector foo:bar: and the selector length. In this example, these checks will be executed before the given methods are called for the object sear in method1. Note that in some embodiments, the system can also modify existing program code to include the expanded testing methods, if desired.

TABLE 4

```
File MyClass.m:
1    // Class interface and implementation for "MyClass"
2
3    @interface MyClass : NSObject {
4        int aVar;        // exemplary instance variables
5        NSString sVar;
6    }
7
8    - (int)method1;    // exemplary method declaration
9    - (int)method2;
10   @end
11
12   '@implementation MyClass
13
14   GM_METHOD_CHECK(NSString,foo:bar:)// Test Macro #1
15   GM_METHOD_CHECK(NSString,length) // Test Macro #2
16
17   -(int) method1{    // exemplary method implementation
18       sVar = (create new NSString instance);
19       [sVar foo:5 bar:2];
20       return [sVar length];
21   }
21   @end
```

In one embodiment of the present invention, one or more testing methods are executed at the onset of program execution. For instance, the system can generate one or more testing methods in response to a set of user requests, and can then execute these testing methods before the main method of the program is called. The OBJECTIVE-C code shown in Table 5 illustrates a set of testing methods for the program code shown in Table 4. The system uses the filename and line numbers illustrated in Table 4 to generate unique method names for the testing methods (e.g., xx_GM_METHOD_CHECK_MyClass_12). Note that these methods can be static method checks that do not involve creating instances of the classes being tested.

The GMMethodChecker function in Table 5 uses lookup techniques to scan through the set of methods defined in the program binary and identify the set of GM_METHOD_CHECK testing methods. For instance, GMMethodChecker can scan through the classes defined in the program binary searching for method names with the "xx_GM_METHOD_CHECK" prefix, and execute those methods. Note that GMMethodChecker is defined as a constructor, or special block of statements automatically called prior to the creation of an object. In this example, GMMethodChecker is automatically called at program start time, and hence verifies that the specified classes and method implementations are linked in before the main function is invoked. In an alternative embodiment, the individual testing methods may also be independently defined as constructors and invoked individually. In another alternative embodiment, the testing methods may be defined to automatically execute at class load time to verify that the required classes and method implementations are included. Note that in some embodiments of the present invention the described techniques do not involve changing the OBJECTIVE-C compiler, and work with any OBJECTIVE-C compiler. However, in some alternate embodiments of the present invention the system described can also be incorporated into a modified compiler.

```
+ (void) XX_GM_METHOD_CHECK_MyClass_12 {
  if (![NSString RespondsToSelector@selector"foo:bar"]) {
    exit(EX_SOFTWARE);
  }
}
+ (void) XX_GM_METHOD_CHECK_MyClass_13 {
  if (![NSString RespondsToSelector@selector"length"]) {
    exit(EX_SOFTWARE);
  }
}
void _attribute_ ((constructor)) GMMethodChecker {
  FindAndExecuteAllGMMethodCheckMethods( );
}
```

In one embodiment of the present invention, the system includes checks that ensure that a given testing method is only invoked once. For instance, the system can track whether a given combination of a class name and a selector has already been tested, and if so, skip additional attempts to test the same class name and selector.

In one embodiment of the present invention, the system automatically detects and executes testing methods defined in additional executable code that is dynamically loaded after execution has begun. For instance, the system may identify and execute additional testing methods while loading additional classes and/or methods from dynamic libraries as well as other sets of executable code.

In one embodiment of the present invention, the system generates the testing methods during the development, testing, and debugging of the program, but does not include the testing methods when compiling a version of the program to be released.

Figure 3:
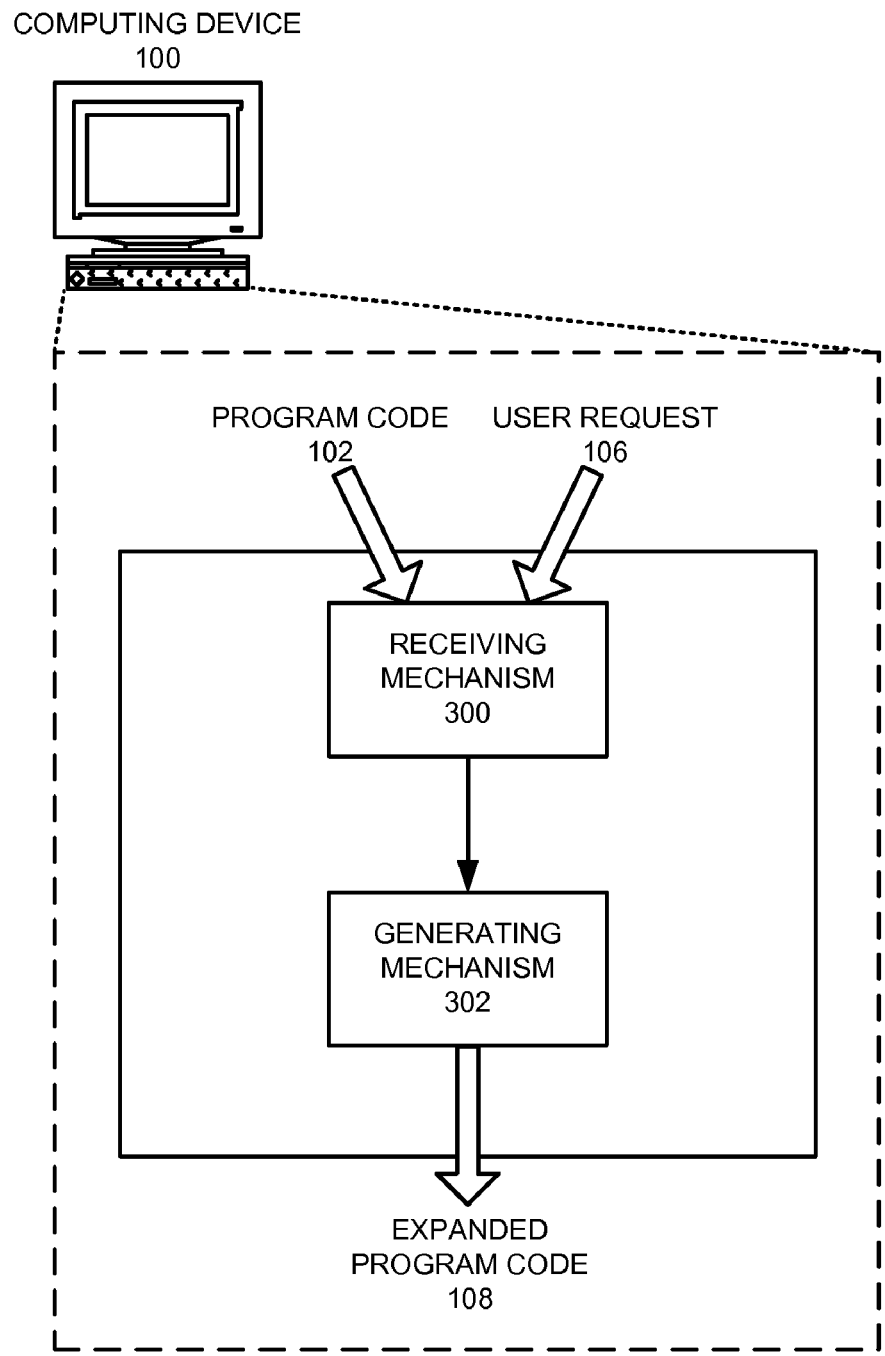
FIG. 3 illustrates an apparatus that verifies that a method has been implemented for a program written in a dynamic programming language in accordance with an embodiment of the present invention.

FIG. 3 illustrates an apparatus in a computing device 100 that verifies that a program method has been implemented for a program written in a dynamic programming language. In FIG. 3, receiving mechanism 300 receives (1) a set of program code 102 written in a dynamic programming language, and (2) a user request 106 to check for an implementation of a program method. Generating mechanism 302 uses information in the user request to generate a testing method that checks whether a class associated with the program method responds to a specific request. This testing program method is output in expanded program code 108, which is compiled and executed at run-time to confirm that the program method is implemented for the program.

In summary, one embodiment of the present invention provides a system that verifies that a program method implementation has been included for a program written in a dynamically-typed programming language. This system leverages user input to generate checks that are executed at run-time to confirm that one or more program methods have been implemented and included. Developers can use this system to declare the methods their classes depend upon, so that an attempt to use these classes without linking in a required set of supporting functionality signals an error.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for verifying that a program method has been implemented for a program written in a dynamically-typed programming language, comprising:
    receiving a user request to determine whether the program method has been implemented for the program prior to encountering the program method at run-time;
    generating a testing program method using information in the user request, wherein the testing program method determines whether a class associated with the program method includes an implementation of the program method written in the dynamically-typed programming language;
    executing the testing program method at run-time to determine whether the program method is implemented for the program; and
    wherein the dynamically-typed programming language resolves data types at run-time.

2. The method of claim 1,
    wherein the user request is specified using a program macro; and
    wherein a preprocessor expands the program macro to generate the testing program method during compilation of the program.

3. The method of claim 2,
    wherein the testing program method is executed at the onset of program execution; and
    wherein if the testing program method indicates that the program method is not implemented in the program, an error is signaled and program execution ends.

4. The method of claim 3, wherein executing the testing program method includes executing the testing program method at run-time in a process separate from a compiler for the dynamically-typed programming language.

5. The method of claim 4, further comprising:
    adding dynamically additional executable code to the program after execution has begun; and
    executing additional testing program methods associated with the additional executable code when the additional executable code is dynamically added.

6. The method of claim 3, further comprising:
generating a set of testing program methods in response to two or more user requests, wherein each program method in the set of testing program methods is unique and includes an identifier; and
wherein a unifying program method in the program identifies and executes the set of testing program methods at the onset of program execution.

7. The method of claim 6, wherein a given testing program method includes checks to ensure that the given testing program method is only executed once for each check related to the program method.

8. The method of claim 1, wherein the testing program method is executed during program development, but is not included in a version of the program to be released.

9. The method of claim 1, wherein the testing program method determines whether a class associated with the program method includes an implementation of the program method by calling a specific program method, wherein the specific program method is defined for all objects in the dynamically-typed programming language and determined whether the implementation of the program method exists for the class.

10. A non-transitory computer-readable storage medium storing instructions that when executed by a computer cause the computer to perform a method for verifying that a program method has been implemented for a program written in a dynamically-typed programming language, the method comprising:
receiving a user request to determine whether the program method has been implemented for the program prior to encountering the program method at run-time;
generating a testing program method using information in the user request, wherein the testing program method determines whether a class associated with the program method includes an implementation of the program method written in the dynamically-typed programming language;
executing the testing program method at run-time to determine whether the program method is implemented for the program; and
wherein the dynamically-typed programming language resolves data types at run-time.

11. The non-transitory computer-readable storage medium of claim 10,
wherein the user request is specified using a program macro; and
wherein a preprocessor expands the program macro to generate the testing program method during compilation of the program.

12. The non-transitory computer-readable storage medium of claim 11,
wherein the testing program method is executed at the onset of program execution; and
wherein if the testing program method indicates that the program method is not implemented in the program, an error is signaled and program execution ends.

13. The non-transitory computer-readable storage medium of claim 12, wherein executing the testing program method includes executing the testing program method at run-time in a process separate from a compiler for the dynamically-typed programming language.

14. The non-transitory computer-readable storage medium of claim 13, wherein the method further comprises:
adding dynamically additional executable code to the program after execution has begun; and
executing additional testing program methods associated with the additional executable code when the additional executable code is dynamically added.

15. The non-transitory computer-readable storage medium of claim 12, wherein the method further comprises:
generating a set of testing program methods in response to two or more user requests, wherein each program method in the set of testing program methods is unique and includes an identifier;
wherein a unifying program method in the program identifies and executes the set of testing program methods at the onset of program execution.

16. The non-transitory computer-readable storage medium of claim 15, wherein a given testing program method includes checks to ensure that the given testing program method is only executed once for each check related to the program method.

17. The non-transitory computer-readable storage medium of claim 10, wherein the testing program method determines whether a class associated with the program method includes an implementation of the program method by calling a specific program method, wherein the specific program method is defined for all objects in the dynamically-typed programming language and determined whether the implementation of the program method exists for the class.

18. An apparatus that verifies that a program method has been implemented for a program written in a dynamically-typed programming language, comprising:
a computing system including memory storing instructions;
a receiving mechanism configured to receive a user request to determine whether the program method has been implemented for the program prior to encountering the program method at run-time;
a generating mechanism, implemented on the computing system having memory storing instructions, and configured to use information in the user request to generate a testing program method, wherein the testing program method determines whether a class associated with the program method includes an implementation of the program method written in the dynamically-typed programming language;
an execution mechanism, configured to execute the testing program method at run-time to determine whether the program method is implemented for the program;
wherein the testing program method is executed at run-time to confirm that the program method is implemented for the program; and
wherein the dynamically-typed programming language resolves data types at run-time.

* * * * *